United States Patent [19]

Yamano et al.

[11] Patent Number: 5,105,333
[45] Date of Patent: Apr. 14, 1992

[54] TEMPERATURE COMPENSATING CERAMIC DIELECTRIC

[75] Inventors: Tamio Yamano; Nobumasa Kugutsu; Tadashi Morimoto; Yasuyuki Naito, all of Nagaokakyo, Japan

[73] Assignee: Murata Mfg. Co., Ltd., Japan

[21] Appl. No.: 674,869

[22] Filed: Mar. 25, 1991

[30] Foreign Application Priority Data

Mar. 26, 1990 [JP] Japan ................... 2-77192

[51] Int. Cl.$^5$ .............. H01G 4/12; H01G 7/00; C04B 35/46
[52] U.S. Cl. .............. 361/321; 252/62.3 BT; 264/61; 501/136
[58] Field of Search ............... 361/321; 501/134, 135, 501/136–139; 264/61; 252/521, 62.3 BT

[56] References Cited

U.S. PATENT DOCUMENTS

| | | | |
|---|---|---|---|
| 3,775,142 | 11/1973 | Roup | 361/321 X |
| 4,540,676 | 9/1985 | Chu et al. | 501/138 |
| 5,010,443 | 4/1991 | Maher | 361/321 |
| 5,013,695 | 5/1991 | Kato et al. | 501/139 |

*Primary Examiner*—Donald A. Griffin
*Attorney, Agent, or Firm*—Ostrolenk, Faber, Gerb & Soffen

[57] ABSTRACT

A temperature compensating ceramic dielectric of the present invention contains compositions consisting of 2.0 to 14.0 mole % of barium oxide, 51.0 to 63.5 mole % of titanium oxide and 22.5 to 47.0 mole % of neodymium oxide as $NdO_{3/2}$. Among the composition range, however, ranges between 2.0 to 9.0 mole % of barium oxide and 60.0 to 63.5 mole % of titanium oxide are to be excluded. By adding 0.1 to 5.0% by weight of niobium oxide as $NbO_{5/2}$ to the composition, the temperature compensating ceramic dielectric is obtained.

1 Claim, 2 Drawing Sheets

F I G. 1
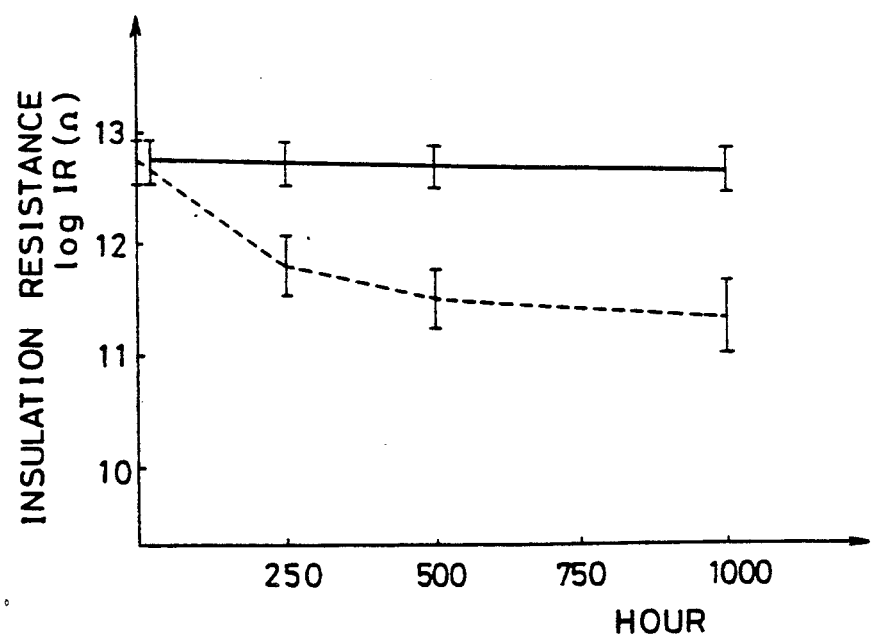

F I G. 2
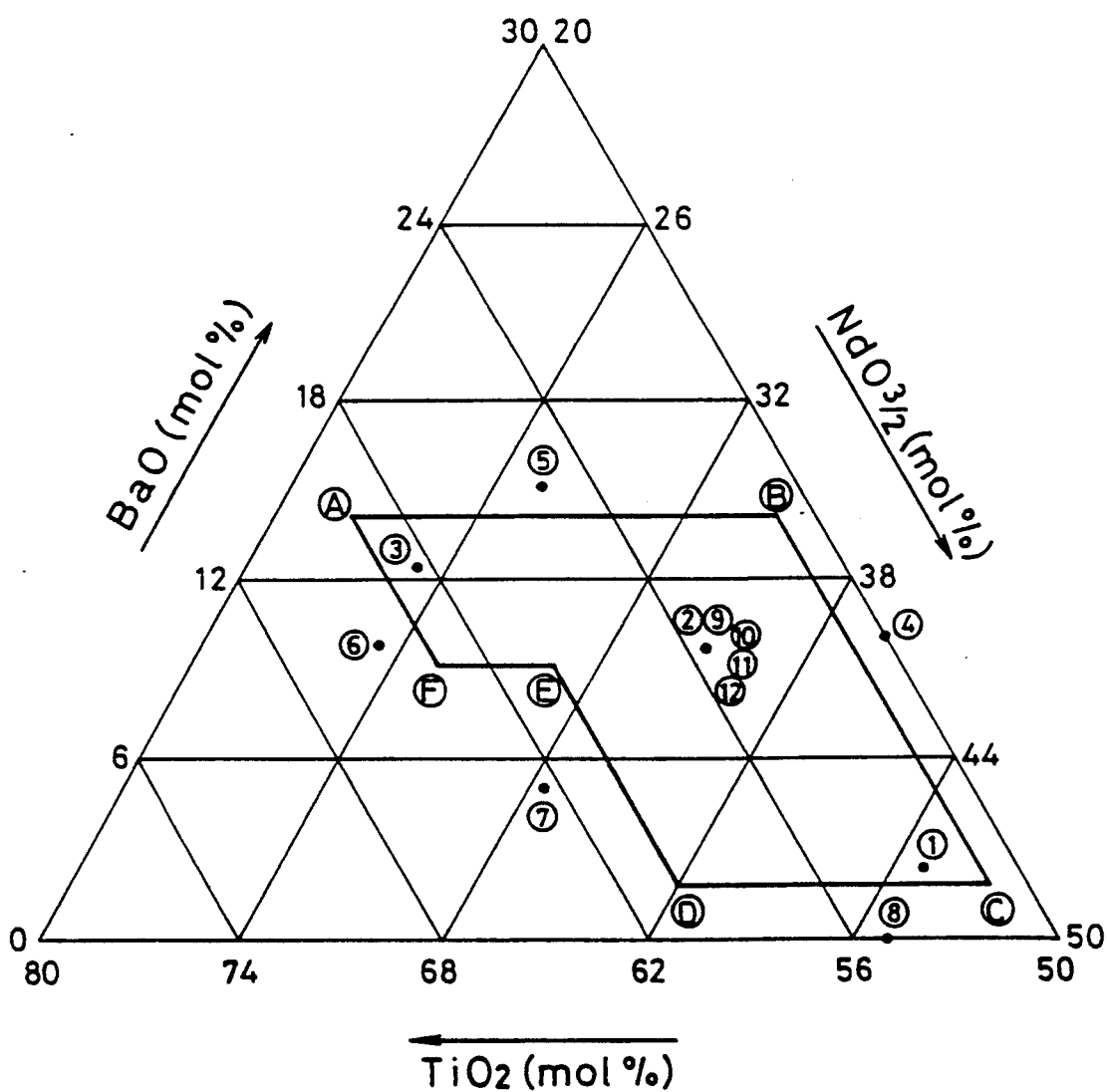

TEMPERATURE COMPENSATING CERAMIC DIELECTRIC

BACKGROUND OF THE INVENTION

1. Field of the Invention

The present invention relates to a temperature compensating ceramic dielectric, and particularly, to a temperature compensating ceramic dielectric used, for example, in a laminated ceramic capacitor and the like.

2. Description of the Prior Art

As this type of temperature compensating ceramic dielectric, for example, a temperature compensating ceramic dielectric consisting of 2.0 to 14.0 mole % of barium oxide, 51.0 to 63.5 mole % of titanium oxide and 22.5 to 47.0 mole % of neodymium oxide as $NdO_{3/2}$ (ranges between 2.0 to 9.0 mole % of barium oxide and 60.0 to 63.5 mole % of titanium oxide in this composition range are to be excluded) is disclosed in Japanese Patent Publication No. 20280/1975. This temperature compensating ceramic dielectric has characteristics of large insulation resistance, permittivity and Q and a small temperature coefficient of permittivity.

In such conventional temperature compensating ceramic dielectric, however, as shown by the dotted line in FIG. 1, such a problem was encountered that the insulation resistance would deteriorate in the high temperature load test. Therefore, it was not sufficient in characteristic point of view to satisfy the requirements on small-sized, large capacity and highly reliable component parts by forming thinner.

SUMMARY OF THE INVENTION

It is, therefore, a primary object of the present invention to provide a temperature compensating ceramic dielectric which has conventional superior characteristics, and whose insulation resistance is difficult to deteriorate even when used in a high temperature.

The present invention is directed to the temperature compensating ceramic dielectric composed of 2.0 to 14.0 mole % of barium oxide, 51.0 to 63.5 mole % of titanium oxide and 22.5 to 47.0 mole % of neodymium oxide as $NdO_{3/2}$ (here, ranges between 2.0 to 9.0 mole % of barium oxide and 60.0 to 63.5 mole % of titanium oxide in this composition range are to be excluded), to which 0.1 to 5.0 % by weight of niobium oxide is added as $NbO_{5/2}$.

According to the invention, the temperature compensating ceramic dielectric having a large insulation resistance, permittivity and Q and a small temperature coefficient of permittivity can be obtained, the insulation resistance being hardly deteriorated even when used in a high temperature. Accordingly, when the temperature compensating ceramic dielectric is used, for example, in a laminated ceramic capacitor and the like, it may be formed thinner, thus small-sized large capacity and highly reliable component parts can be obtained.

The above and other objects, features, aspects and advantages of the present invention will become more apparent by the following detailed description of the embodiments made in connection with the accompanying drawings.

BRIEF DESCRIPTION OF THE DRAWINGS

FIG. 1 is a graph showing the results of high temperature load test of a temperature compensating ceramic dielectric of the present invention and a conventional temperature compensating ceramic dielectric.

FIG. 2 is a 3-component composition diagram showing the composition of the temperature compensating ceramic dielectric shown in the embodiment.

DESCRIPTION OF THE PREFERRED EMBODIMENTS

As raw materials, first, barium carbonate, titanium oxide, neodymium oxide and niobium oxide were prepared. These raw materials were weighed and blended to prepare compositions shown in the table, which was calcined in air for one hour at 920° C. to obtain calcined products. The calcined products were blended again and pulverized to obtain a slurry by adding an organic binder. This slurry was used to obtain a green sheet of 30 to 100 μm thick by a sheet molding process such as a doctor blade process.

A paste consisting of palladium powder and an organic vehicle was prepared. As materials of the paste, a powder of platinum and palladium alloy may be used. The paste was subjected to screen process printing on the green sheet. The green sheet onto which the paste is printed was laminated and heat-pressed to prepare a laminate of 2 to 40 layers.

The laminate was cut into any suitable size and baked in an electric furnace at 1300° C. to obtain a sintered chip. On the edge face of the chip, a paste comprising silver and palladium alloy powder or silver powder was coated and baked at 700 to 900° C. to form a terminal electrode, thereby obtaining a laminated ceramic capacitor.

For the laminated ceramic capacitor, under the measurement condition of + 25° C. and 1 MHz, a permittivity $\epsilon$, temperature coefficient TC of permittivity, insulation resistance IR and Q were measured. Also, a high-temperature load test was performed. As the high-temperature load test, after applying the voltage which is as twice the rated voltage for 1000 hours at 125° C., the insulation resistance was measured. Measured results were shown in the Table. For the Sample No. 1 among these laminated ceramic capacitors, the result of high-temperature load test was shown by the solid line in FIG. 1.

As it is apparent from FIG. 1, in the temperature compensating ceramic dielectric of the present invention, as compared with the conventional one, the deterioration of insulation resistance hardly occurs even when used in a high temperature.

Next, referring to the 3-component composition diagram shown in FIG. 2, restricted reasons of the composition range will be described. In the 3-component composition diagram, a portion surrounded by six points A, B, C, D, E and F shown the composition within the range of the invention. Coordinates of the six points are as follows when indicated in order of BaO, $TiO_2$ and $NdO_{3/2}$.

A (14.0, 63.54, 22,5)
B (14.0, 51.0, 35.0)
C (2.0, 51.0, 47.0)
D (2.0, 60.0, 38.0)
E (9.0, 60.0, 31.0)
F (9.0, 63.5, 27.5)

Points indicating compositions of respective sample numbers are shown on the 3-component composition diagram. In the range outside the line connecting the points B and C as the Sample No 4, it is not desirable since only a porous ceramic can be obtained at temperature of 1400° C. which is usually used in sintering the ceramics for capacitor.

In case the range is outside the line connecting the points A and B as the Sample No. 5, or outside the line connecting the points A and F as the Sample No. 6, or outside the line connecting the points E and D as the Sample No. 7, it is not desirable since the temperature coefficient of the permittivity moves to the minus side and the permittivity is not large.

In case the range is outside the line connecting the Points C and D as the Sample No. 8, it is not desirable since the temperature coefficient of the permittivity moves to the plus side and the permittivity is not large either.

Meanwhile, restricted reasons of the quantity of addition of niobium oxide will be explained.

When the quantity of addition of niobium oxide is less than 0.1% by weight as the Sample No. 9, it is not desirable since the deterioration of insulation resistance in the high-temperature load test is large.

When the quantity of addition of niobium oxide is more than 5% by weight as the Sample No. 10, it is not desirable since the Q value becomes smaller.

On the contrary, in the temperature compensating ceramic dielectric within the range of the invention, the insulation resistance, Q and permittivity are large and the temperature coefficient of permittivity is small, moreover, the deterioration of insulation resistance hardly occurs even when used in a high temperature.

In compositions of the temperature compensating ceramic dielectric of the invention, since neodymium contains more impurities, the raw material containing lanthanum, samarium and praseodymium may be used.

While the present invention has been particularly described and shown, it is to be understood that such description is used as an example rather than limitation, and the spirit and scope of the present invention is determined solely by the terms of the appended claims.

TABLE

| Sample No. | Main Component (mole %) | | | Additives (% by weight) | Permittivity | Q | TC | Insulation Resistance log IR | High-temperature Load Test log IR |
|---|---|---|---|---|---|---|---|---|---|
| | BaO | TiO$_2$ | NdO$_{3/2}$ | Nb$_2$O$_5$ | $\epsilon$ | | ($\times 10^{-6}$/°C.) | ($\Omega$) | ($\Omega$) |
| 1 | 2.5 | 52.5 | 45.0 | 2 | 53.2 | >100000 | +113 | 12.76 | 12.71 |
| 2 | 10.0 | 55.0 | 35.0 | 2 | 81.8 | 22000 | −34 | 12.73 | 12.72 |
| 3 | 12.5 | 62.5 | 25.0 | 2 | 99.1 | 36000 | −254 | 12.45 | 12.46 |
| 4* | 10.0 | 50.0 | 40.0 | 2 | 48.5 | 700 | −40 | 10.92 | 10.88 |
| 5* | 15.0 | 57.5 | 27.5 | 2 | 114 | 56000 | −226 | 12.94 | 12.78 |
| 6* | 10.0 | 65.0 | 25.0 | 2 | 103 | 17000 | −303 | 12.53 | 12.51 |
| 7* | 5.0 | 62.5 | 32.5 | 2 | 64.4 | >100000 | −72 | 12.81 | 12.78 |
| 8* | 0 | 55.0 | 45.0 | 2 | 37.3 | 11000 | +136 | 11.52 | 11.56 |
| 9* | 10.0 | 55.0 | 35.0 | 0.05 | 82.6 | 23000 | −27 | 12.79 | 11.23 |
| 10* | 10.0 | 55.0 | 35.0 | 8.0 | 81.1 | 4600 | −36 | 12.75 | 12.73 |
| 11 | 10.0 | 55.0 | 35.0 | 0.1 | 82.3 | 25000 | −30 | 12.77 | 12.63 |
| 12 | 10.0 | 55.0 | 35.0 | 5 | 81.7 | 12000 | −33 | 12.60 | 12.08 |

*indicates ranges outside the invention

What is claimed is:

1. A temperature compensating ceramic dielectric consisting of 2.0 to 14.0 mole % of barium oxide, 51.0 to 63.5 mole % of titanium oxide and 22.5 to 47.0 mole % of neodymium oxide as NdO$_{3/2}$ (here, ranges between 2.0 to 9.0 mole % of barium oxide and 60.0 to 63.5 mole % of titanium oxide in the composition range are to be excluded), to which 0.1 to 5.0% by weight of niobium oxide is added as NbO$_{5/2}$.

* * * * *